United States Patent
Kim et al.

(10) Patent No.: US 12,286,325 B2
(45) Date of Patent: Apr. 29, 2025

(54) STORAGE CONTAINER FOR WELDING WIRE

(71) Applicant: KISWEL LTD., Busan (KR)

(72) Inventors: Seong Hun Kim, Changwon-si (KR);
Ho Kyu Kang, Changwon-si (KR);
Chang Uk Song, Changwon-si (KR);
Kyo Hun Kim, Changwon-si (KR);
Hwi Chul Park, Changwon-si (KR)

(73) Assignee: KISWEL LTD., Busan (KR)

( * ) Notice: Subject to any disclaimer, the term of this patent is extended or adjusted under 35 U.S.C. 154(b) by 35 days.

(21) Appl. No.: 18/040,289

(22) PCT Filed: May 28, 2021

(86) PCT No.: PCT/KR2021/006653
§ 371 (c)(1),
(2) Date: Feb. 2, 2023

(87) PCT Pub. No.: WO2022/039352
PCT Pub. Date: Feb. 24, 2022

(65) Prior Publication Data
US 2023/0286775 A1    Sep. 14, 2023

(30) Foreign Application Priority Data
Aug. 18, 2020 (KR) .................. 10-2020-0103281

(51) Int. Cl.
*B65D 85/04* (2006.01)
*B65D 17/28* (2006.01)
(Continued)

(52) U.S. Cl.
CPC ............. *B65H 49/08* (2013.01); *B65D 17/28* (2018.01); *B65D 25/108* (2013.01); *B65D 77/0486* (2013.01); *B65D 85/04* (2013.01)

(58) Field of Classification Search
CPC .... B65D 25/02; B65D 77/0486; B65D 85/04; B65H 49/08; B65H 2701/36
(Continued)

(56) References Cited

U.S. PATENT DOCUMENTS 4,312,448 A * 1/1982 Pelster ................. B65D 85/675
                                                    242/146
6,079,560 A * 6/2000 Champion ............ B65D 19/20
                                                    206/386
(Continued)

FOREIGN PATENT DOCUMENTS

JP    61-017977 Y2    5/1986
JP    2001-301886 A   10/2001
(Continued)

OTHER PUBLICATIONS

International Search Report of PCT/KR2021/006653 dated Nov. 24, 2021 [PCT/ISA/210].
(Continued)

*Primary Examiner* — Luan K Bui
(74) *Attorney, Agent, or Firm* — Sughrue Mion, PLLC

(57) ABSTRACT

An embodiment of the present invention provides a storage container for welding wire, the storage container comprising: an outer shell which has an outer bottom support portion formed at the bottom thereof and within which a wire storage portion for storing coiled welding wire is formed; a bottom part which is seated on and coupled to the outer bottom support portion; an inner shell which comes into close contact with the inner surface of the outer shell and has an inner bottom support portion formed at the bottom thereof and seated on the bottom part; and a cover which is formed to correspond to the shape of the outer shell and closes the top of the outer shell.

8 Claims, 15 Drawing Sheets

(51) Int. Cl.
  *B65D 25/10* (2006.01)
  *B65D 77/04* (2006.01)
  *B65H 49/08* (2006.01)

(58) Field of Classification Search
  USPC .................................. 206/407, 409, 413, 414
  See application file for complete search history.

(56) References Cited

U.S. PATENT DOCUMENTS

| | | | |
|---|---|---|---|
| 10,899,495 B2 | 1/2021 | Kim et al. | |
| 2005/0224381 A1* | 10/2005 | Bae ........................ | B23K 9/133 |
| | | | 206/409 |
| 2012/0097672 A1* | 4/2012 | Carroscia ............... | B65D 85/04 |
| | | | 220/23.83 |
| 2013/0081967 A1* | 4/2013 | Gaul ...................... | B65D 43/22 |
| | | | 206/386 |
| 2014/0262891 A1* | 9/2014 | Babcock ................. | B65B 25/24 |
| | | | 229/122 |
| 2015/0353270 A1 | 12/2015 | Gaul | |
| 2019/0263555 A1* | 8/2019 | Kim ........................ | B65D 5/64 |

FOREIGN PATENT DOCUMENTS

| | | |
|---|---|---|
| JP | 2009-078867 A | 4/2019 |
| JP | 2019-150876 A | 9/2019 |
| KR | 20-0226777 Y1 | 6/2001 |
| KR | 10-2005-0018018 A | 2/2005 |
| KR | 10-2018-0045464 A | 5/2018 |
| KR | 10-1997737 B1 | 7/2019 |
| WO | 2018/226480 A1 | 12/2018 |

OTHER PUBLICATIONS

Japanese Office Action dated Dec. 19, 2023 in Japanese Application No. 2023-506193.

* cited by examiner ( a )                                    ( b )

(a)

(b)

(a)    (b)

STORAGE CONTAINER FOR WELDING WIRE

CROSS REFERENCE TO RELATED APPLICATIONS

This application is a National Stage of International Application No. PCT/KR2021/006653 filed on May 28, 2021, claiming priority based on Korean Patent Application No. 10-2020-0103281 filed on Aug. 18, 2020, the entire disclosures of which are incorporated herein by reference.

TECHNICAL FIELD

The present invention relates to a storage container for a welding wire, and more specifically, to a storage container for a welding wire which does not require a separate head cap member because of including a cover having a perforated portion which is easy to recycle, is resistant to an external impact and buckling load, and is easily torn for using.

BACKGROUND ART

In the conventional and general large storage containers for a welding wire, a welding wire is accommodated in a coiled shape in a case body, an inner surface of the case body is sheathed with a resin, an opening part of an upper end of the case body is covered by a cover formed of a metal material, and a boundary between the case body and the cover is sealed by a sealing member such as rubber. In addition, in the case body of the storage container, a lower end portion and an upper end portion, which are portions requiring strength, are reinforced by metal members having ring shapes.

Meanwhile, there are cases in which a storage container is repeatedly used for accommodating a welding wire after used, but the storage container is generally discarded after being used a predetermined number of times. Before the storage container is discarded, the metal members formed of the metal material and having the ring shape and the cover need to be separated from the case body. If not, while all the metal members having the ring shape and the cover are not separated, the metal members are treated as industrial waste. Accordingly, a recycling process of the conventional storage container is complex and non-eco-friendly.

Accordingly, efforts to eliminate reinforcing members such as metal members or plastic members for reinforcing strength and manufacture an entire storage container using a paper material have been recently continued.

However, paper-based storage containers are vulnerable to external impacts compared to the conventional storage containers. In addition, in a state in which welding wires are accommodated in the paper-based storage containers, when the paper-based storage containers are stacked in two stages, there is a problem that the lower storage container should overcome a buckling load applied from the upper storage container.

In addition, storage containers for a welding wire may be divided into a single type, which is used after connecting a welding wire wound in a next container and a withdrawal device when a welding wire wound in one container is all exhausted, or an endless type which is continuously used after coupling two storage containers in a tandem manner and connecting a last end of a wire wound in one storage container and a leading end of a wire wound in another storage container when the wire in the one storage container is almost exhausted.

In this case, according to the conventional technique, there is a problem that production costs increase because a cover should be separately manufactured and supplied according to a type of a storage container for a welding wire required by a consumer.

RELATED ART (Patent Document 1) Japanese Laid-Open Patent Publication No. 001-301886 (Oct. 31, 2001)

Technical Problem

The present invention is intended to solve the problems of the conventional technique and directed to providing a storage container for a welding wire which does not require a separate head cap member because of including a cover having a perforated portion which is easy to recycle, is resistant to an external impact and buckling load, and is easily torn for using.

Technical Solution

One aspect of the present invention provides a storage container for a welding wire, including an outer case having a lower end at which an outer bottom support is formed and an inner portion in which a wire accommodation portion for accommodating a wound welding wire is formed, a bottom part seated on and coupled to the outer bottom support, an inner case which is in close contact with an inner surface of the outer case and has a lower portion in which an inner bottom support on which the bottom part is seated is formed, and a cover which is formed to correspond to a shape of the outer case and closes an upper portion of the outer case.

The storage container may further include an elastic body maintaining member which passes and is inserted through a cut groove of the bottom part and is formed to hook an elastic body.

The elastic body maintaining member may include an insertion part which passes and is inserted upward through the cut groove from under the bottom part and an insertion support formed under the insertion part to set an insertion limit, and the insertion part may include a hook portion having a circular hole shape in which the elastic body is hooked and a through path formed to pass through from an outside of the insertion part to the hook portion so that the outside of the insertion part communicates with the hook portion.

The cover may include a blocking part which is formed in a shape corresponding to a cross section of the outer case and closes the upper portion of the outer case, a side surface forming part that is connected to the blocking part and is bent from the blocking part to surround and be fitted onto an outer surface of the upper portion of the outer case, a side surface fixing part which is alternately provided with the side surface forming part along a side of the blocking part and fixes an adjacent side surface forming part, and a perforated portion formed in the blocking part to be cut so that the welding wire wound in the outer case is withdrawn to an outside.

The perforated portion may include a first perforated portion formed in a circular shape in a central portion of the blocking part.

The perforated portion may include a second perforated portion including a first straight portion and a second straight portion formed in parallel from one side to the central portion of the blocking part, a curved portion formed to connect the first straight portion and the second straight portion in the central portion of the blocking part, and a third straight portion which overlaps the one side of the blocking part and is formed to connect the first straight portion and the second straight portion.

The second perforated portion may be formed so that the first perforated portion formed in the central portion of the blocking part is positioned in an area surrounded by the second perforated portion.

The first perforated portion may include a first arc portion and a second arc portion of which ratios of cut portions per unit length are different, and the ratio (R1) of the cut portion per unit length of the first arc part may be greater than the ratio (R2) of the cut portion per unit length of the second arc portion.

A ratio (R3) of a cut portion per unit length of at least one of the curved portion and the third straight portion may be greater than a ratio (R4) of a cut portion per unit length of the first straight portion and the second straight portion.

At least one of the outer case, the outer bottom support, the bottom part, and the inner bottom support may include a strength reinforcement part and a shock absorption part which is formed inside the strength reinforcement part and absorbs an external impact.

Advantageous Effects

According to one aspect of the present invention, since an outer case includes a strength reinforcement part and a shock absorption part and an inner case is closely coupled to an inner portion of the outer case, a storage container for a welding wire is not dented or broken, and a welding wire therein can be stably protected even when an external impact is applied.

In addition, even when storage containers for a welding wire of the present invention are vertically stacked, buckling does not occur.

In addition, since a storage container for a welding wire can be manufactured of a paper material there is no need for separate parts of other materials such as a metal and plastic to reinforce the storage container, and a strap is easily disassembled, the storage container for a welding wire is easily dissembled and recycled.

In addition, after a welding wire is all used, transportation costs required to recycle a storage container for a welding wire and costs required to discard the storage container for a welding wire as industrial waste can be reduced.

In addition, a cover includes a perforated portion and can be directly used without a separate head cap member and implemented as an adapter connection type or an endless type according to an application.

In addition, a ratio of a cut portion per unit length of a perforated portion is different for each portion, and thus the perforated portion can be removed more efficiently.

In addition, a cover can be manufactured by assembling a side surface forming part and a side surface fixing part. Such a cover can be manufactured without a separate fastening member, and a manufacturing process is simple.

Effects of the present invention are not limited to the above-described effects, and it should be understood that the effects of the present invention include any effect which may be inferred from the configuration of the invention described in the detailed description and the claims of the present invention.

Figure 5:
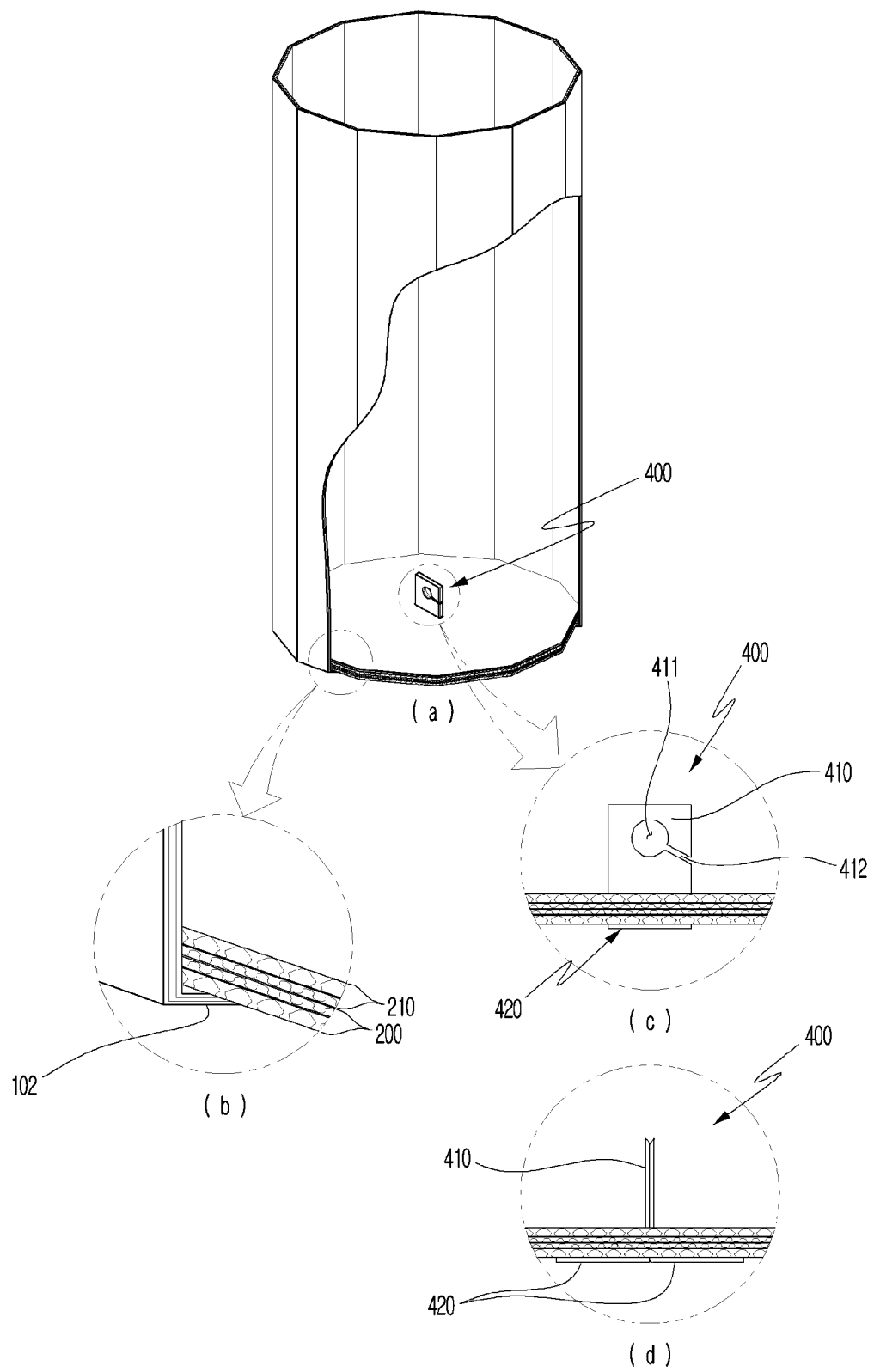

(a) of FIG. 5 is a cutaway view illustrating a state in which the outer case, a bottom part, the bottom reinforcement part, an elastic body maintaining member, and a strap are coupled according to one embodiment of the present invention, and (b) to (d) of FIG. 5 are partially enlarged views illustrating portions of (a) of FIG. 5.

Figure 6:
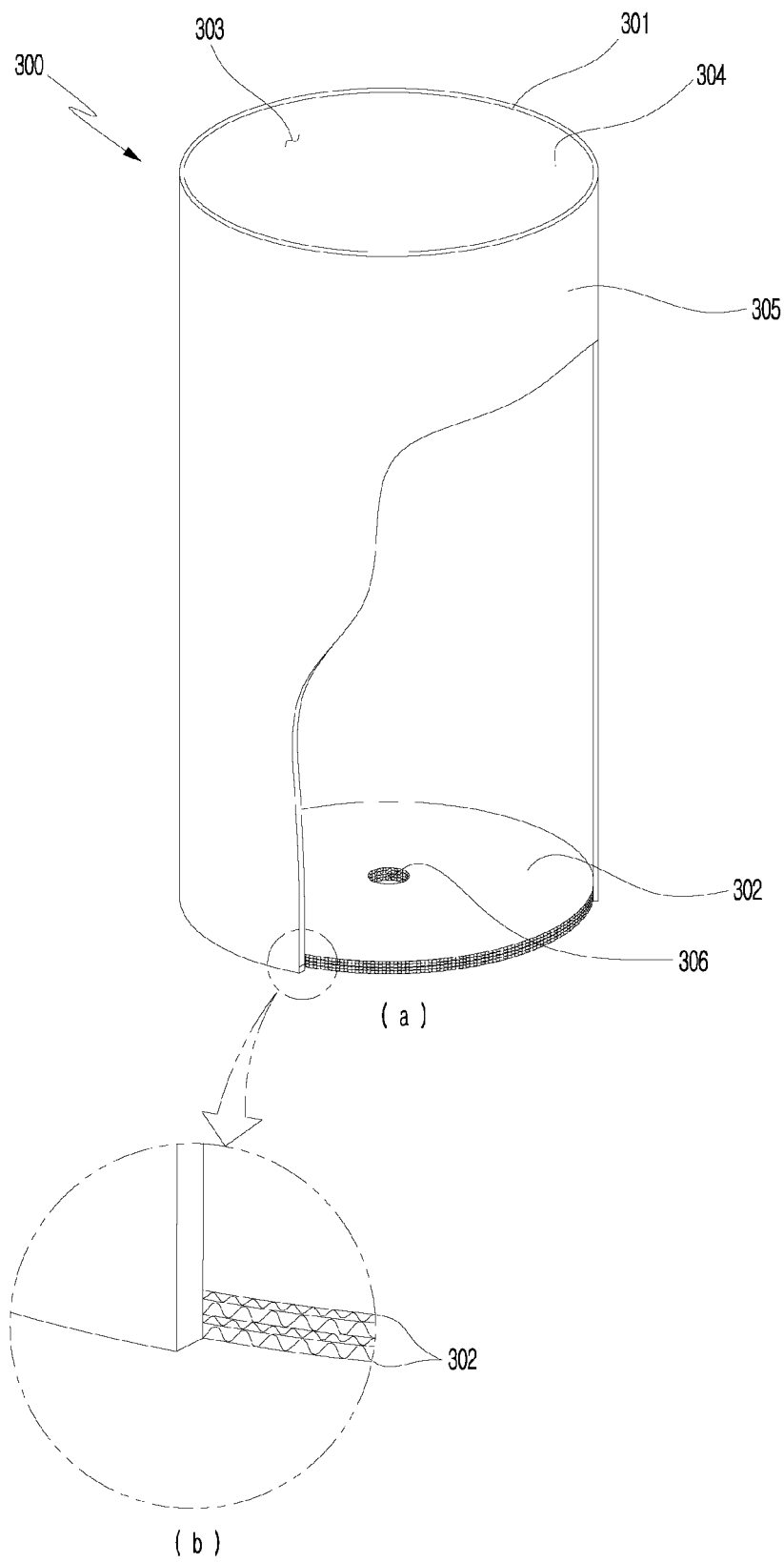

(a) and (b) of FIG. 6 are a cutaway view illustrating an inner case and a partially enlarged view illustrating a portion of (a) of FIG. 6, respectively.

Figure 7:
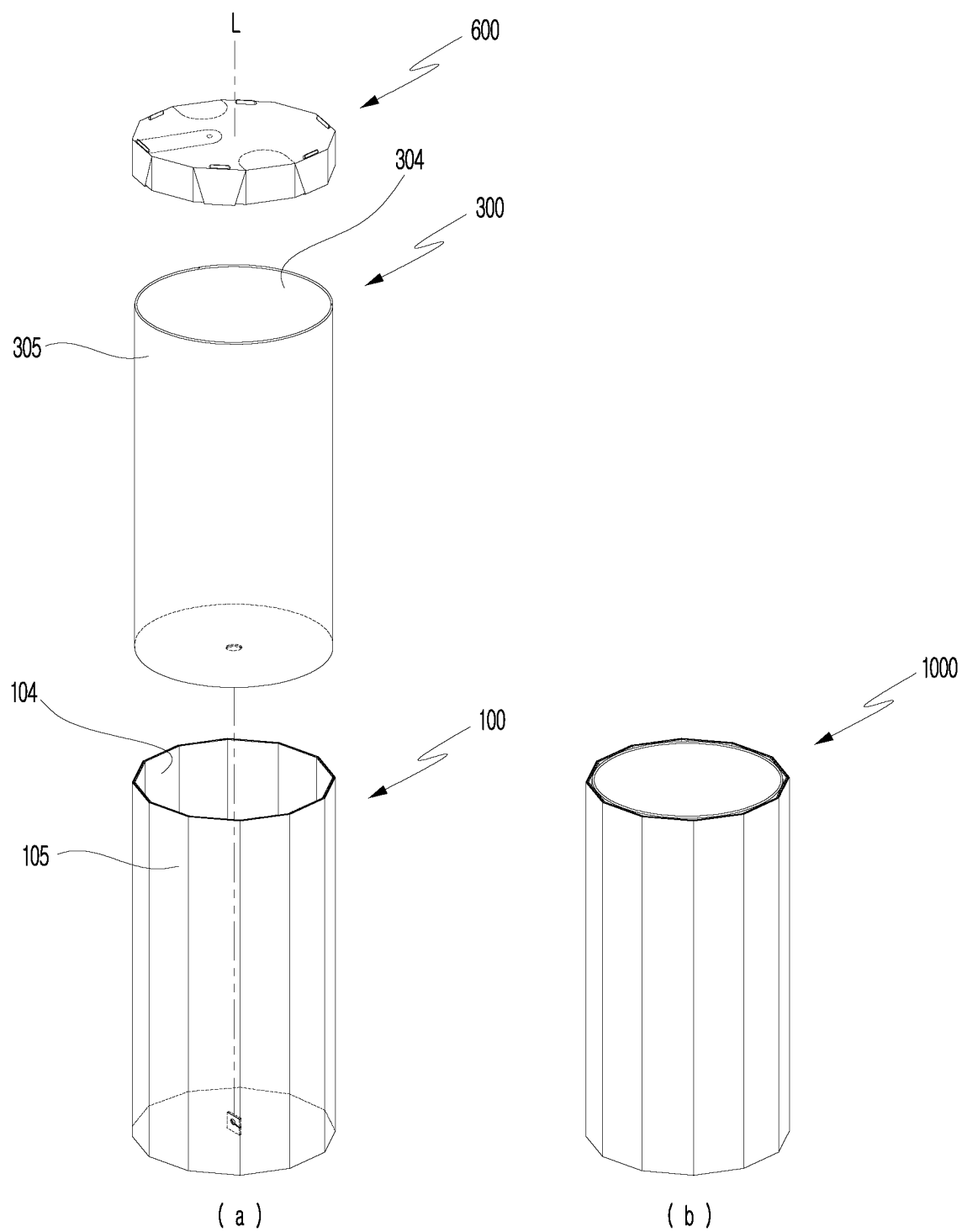

FIG. 7 is an exploded assembly view illustrating a state in which the inner case is inserted into the outer case along an axis (L) and a cover is covered on upper portions of the inner and outer cases and a view illustrating a state in which the outer case and the inner case of the present invention are coupled, respectively.

Figure 8:
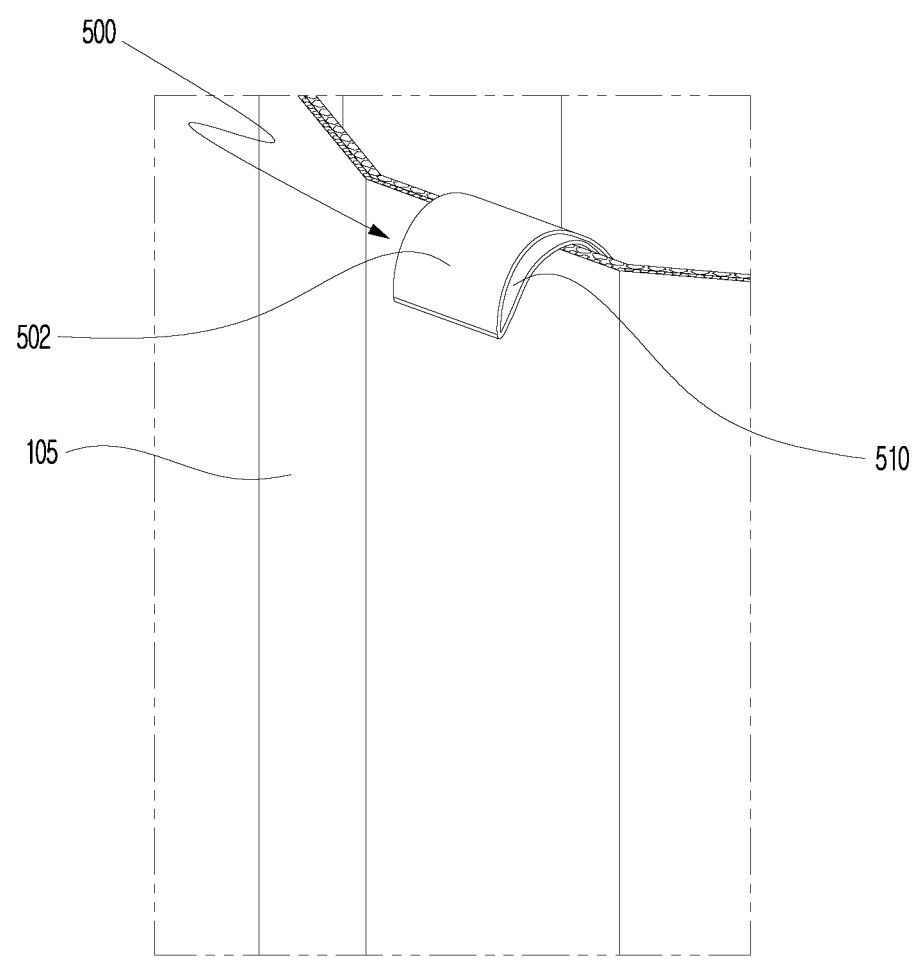

FIG. 8 is a perspective view illustrating a portion of the outer case according to one embodiment of the present invention.

Figure 9:
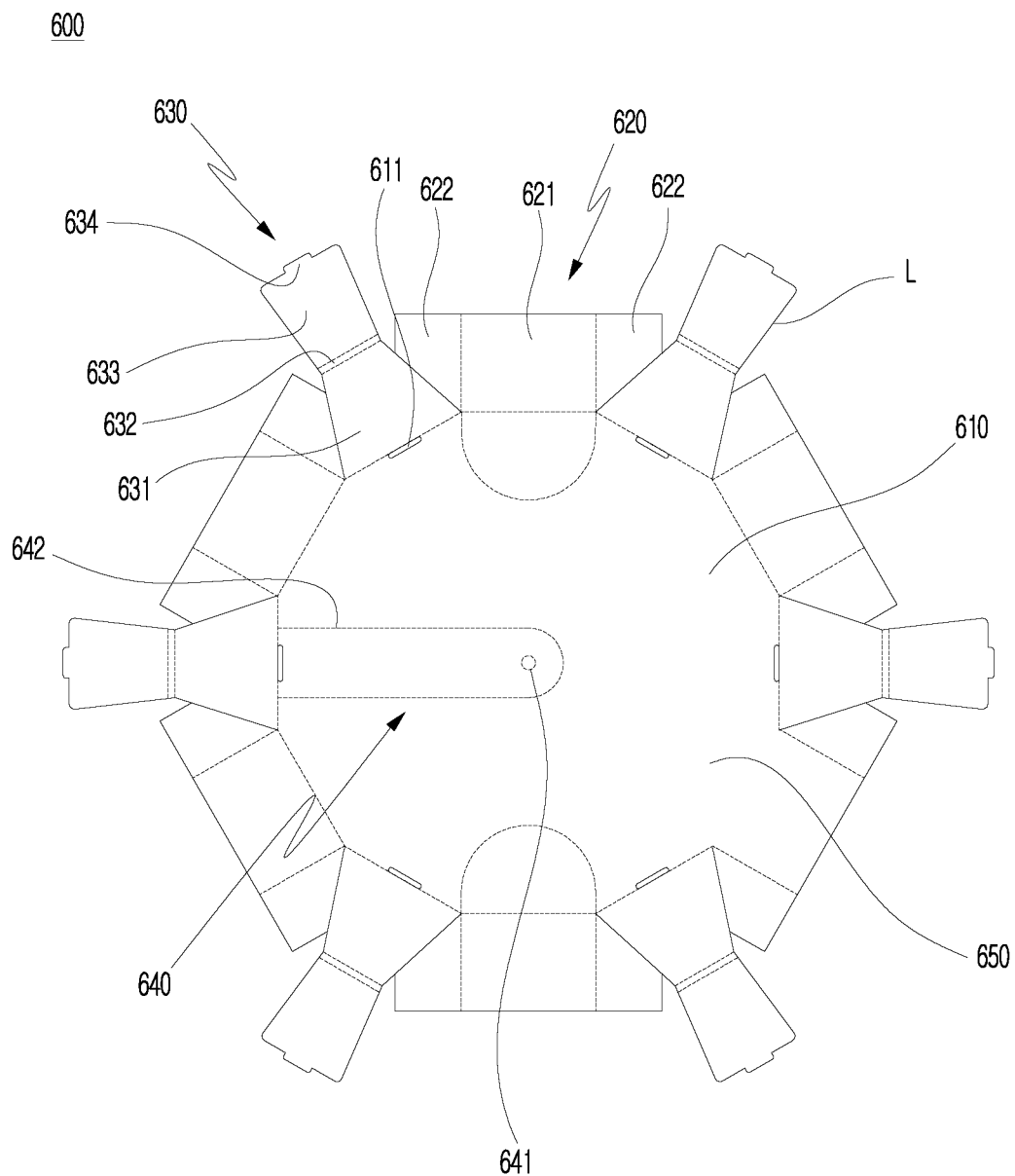

FIG. 9 is a development view illustrating the cover according to one embodiment of the present invention.

Figure 10:
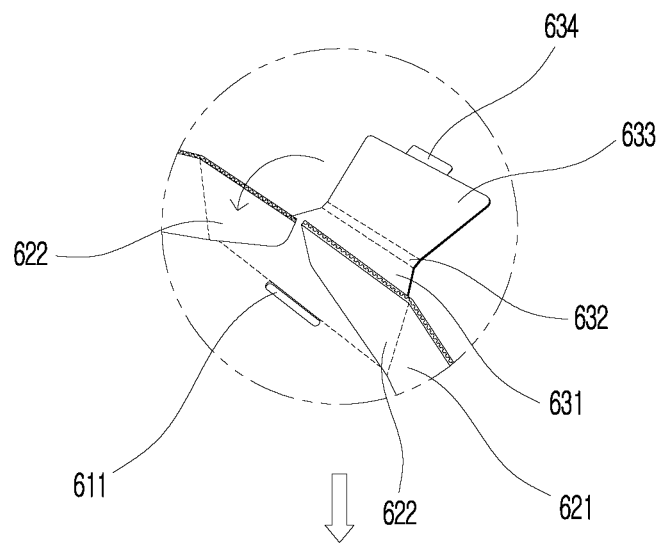
Figure 10:
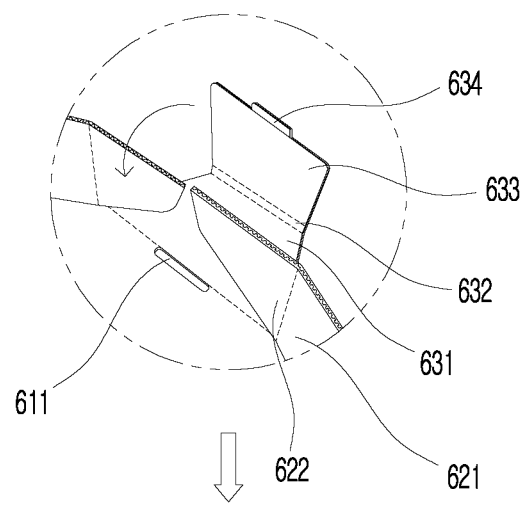
Figure 10:
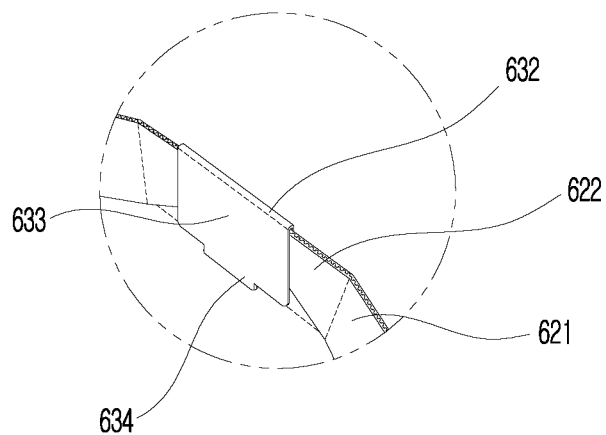

FIG. 10 is an assembly view of a main portion for showing a process of assembling the cover according to one embodiment of the present invention.

Figure 11:
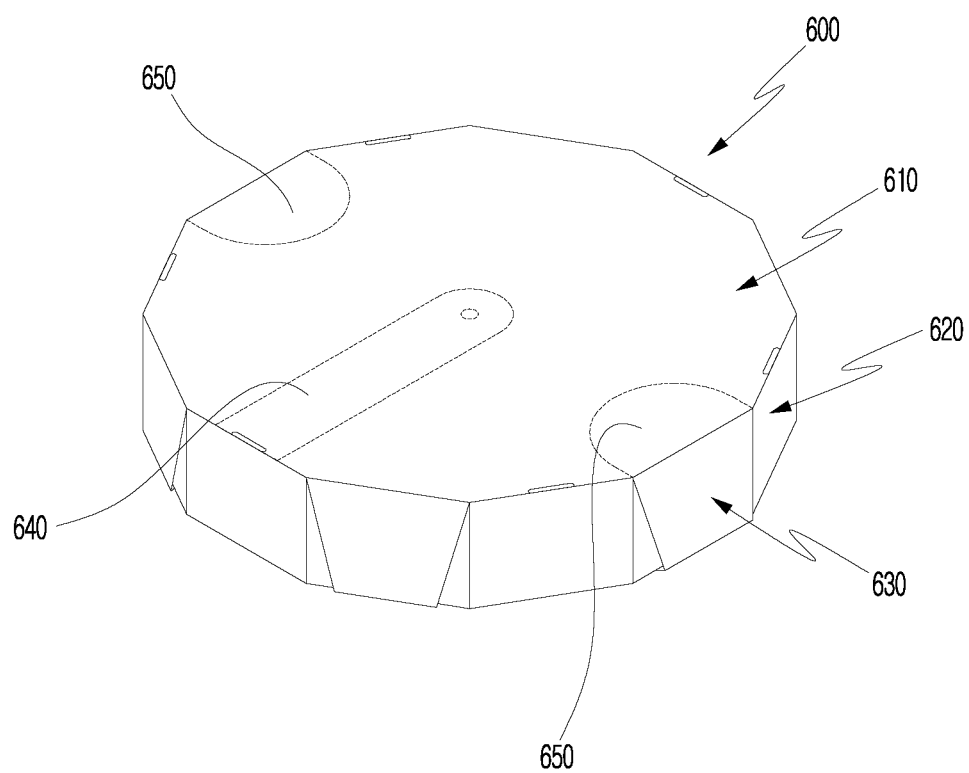

FIG. 11 is a perspective view illustrating the assembled cover according to one embodiment of the present invention.

Figure 12:
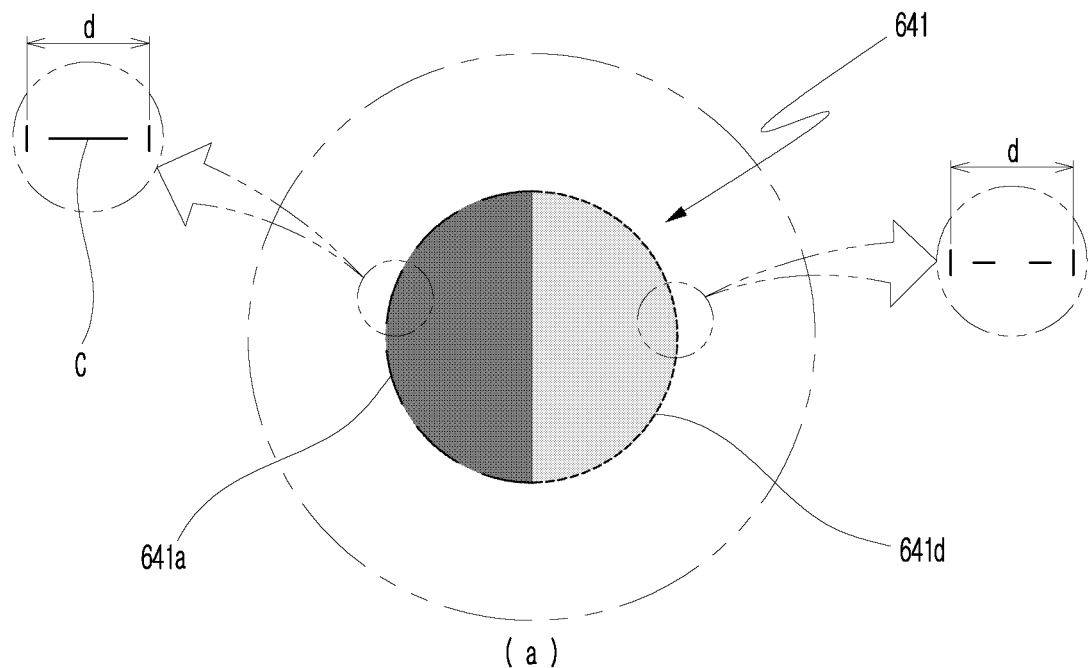
Figure 12:
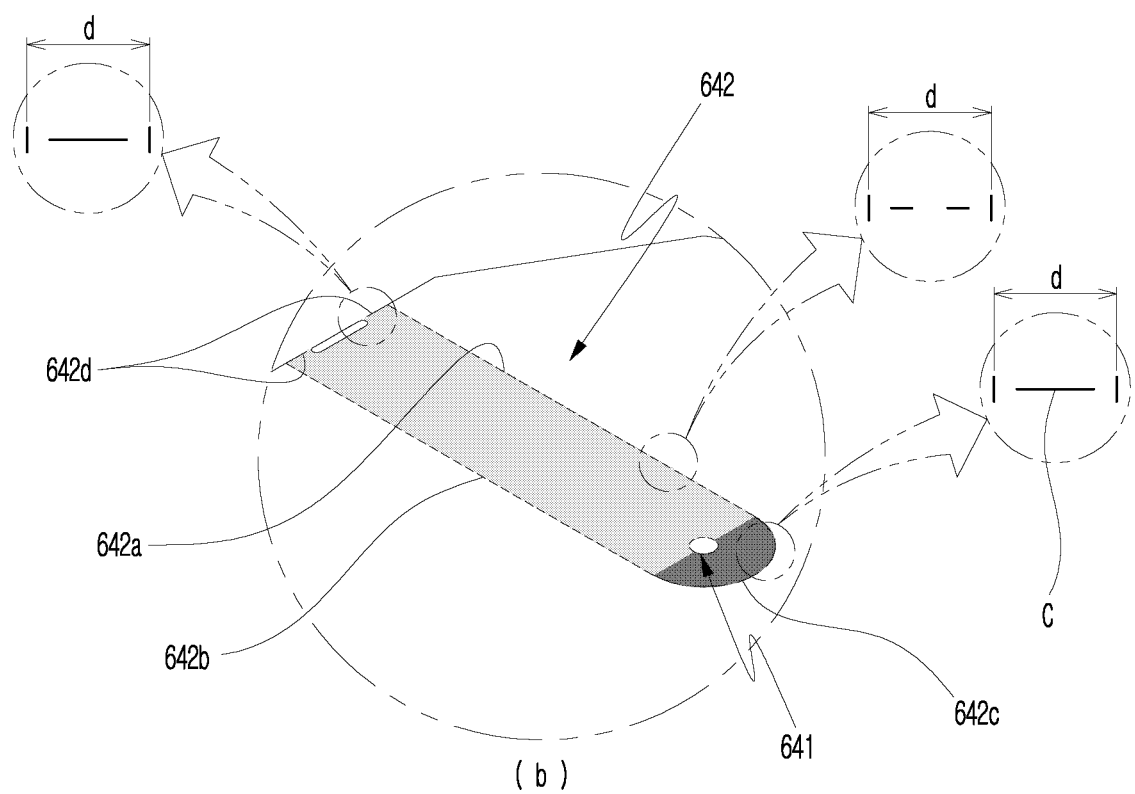

(a) and (b) of FIG. 12 are views illustrating a first perforated portion and a second perforated portion included in the cover according to one embodiment of the present invention, respectively.

Figure 13:
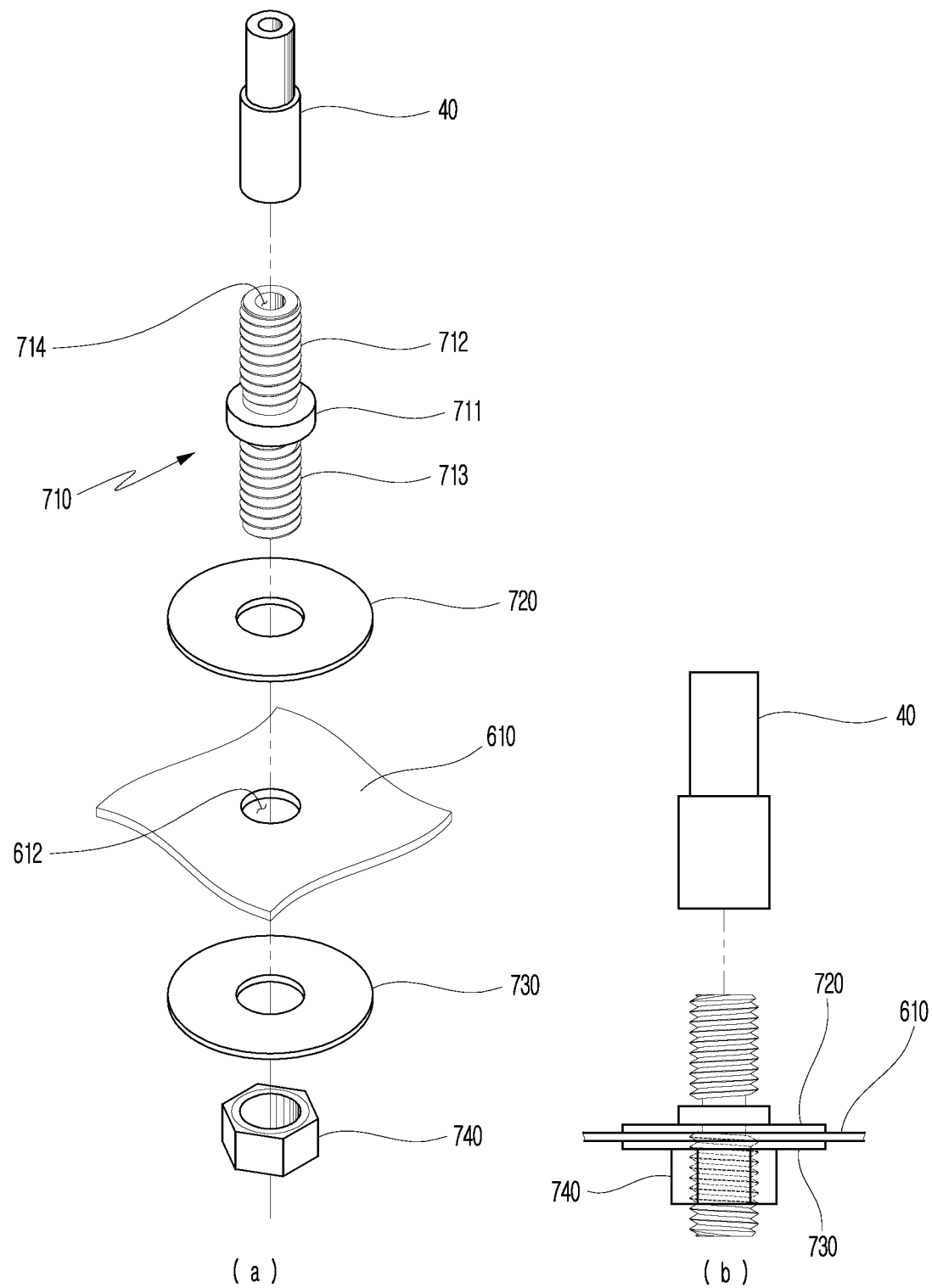

(a) and (b) of FIG. 13 are an exploded view and a coupling view illustrating a connection adapter according to one embodiment of the present invention, respectively.

Figure 14:
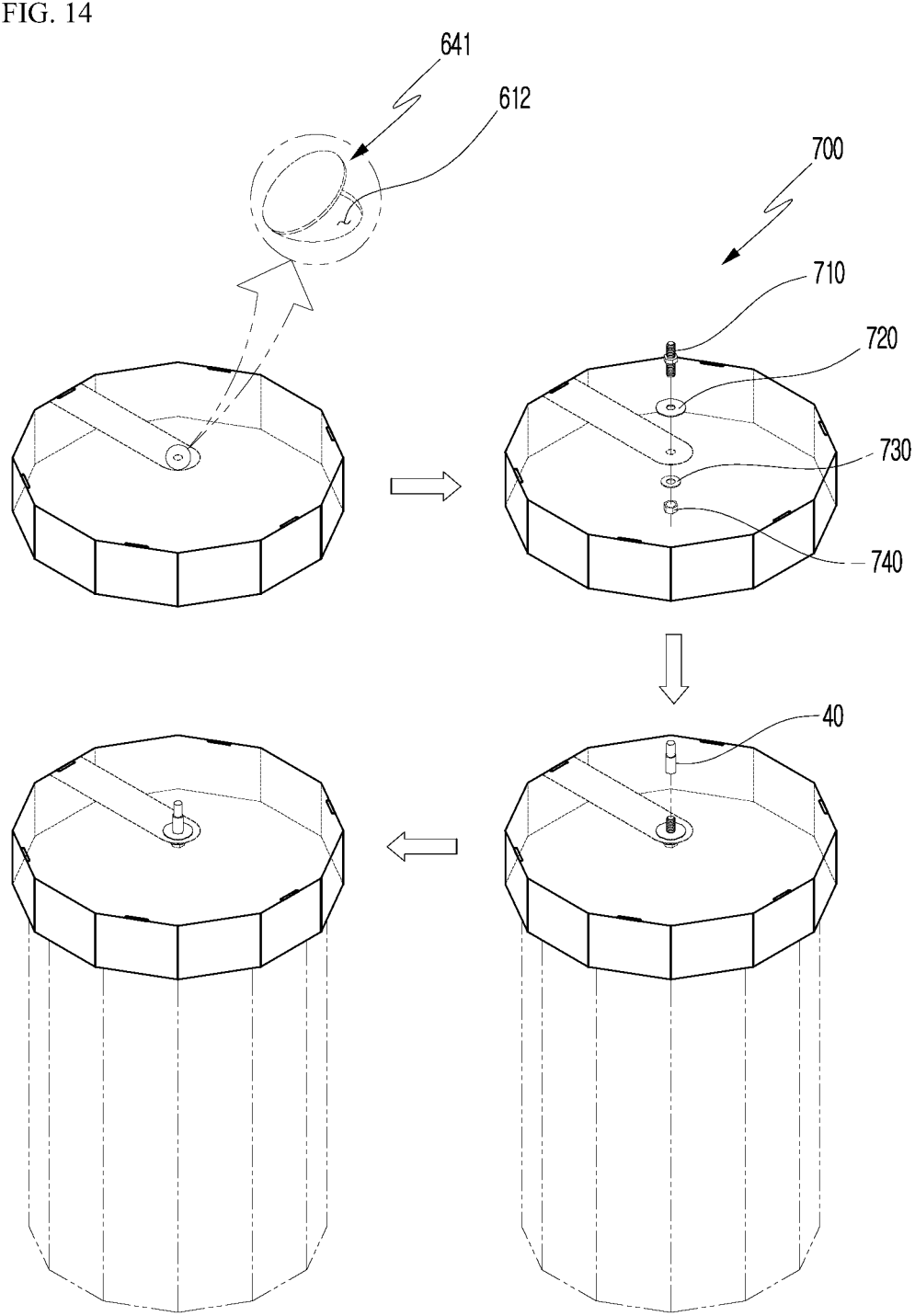

FIG. 14 is a sequence diagram illustrating a process in which the connection adapter is coupled to the cover according to one embodiment of the present invention.

Figure 15:
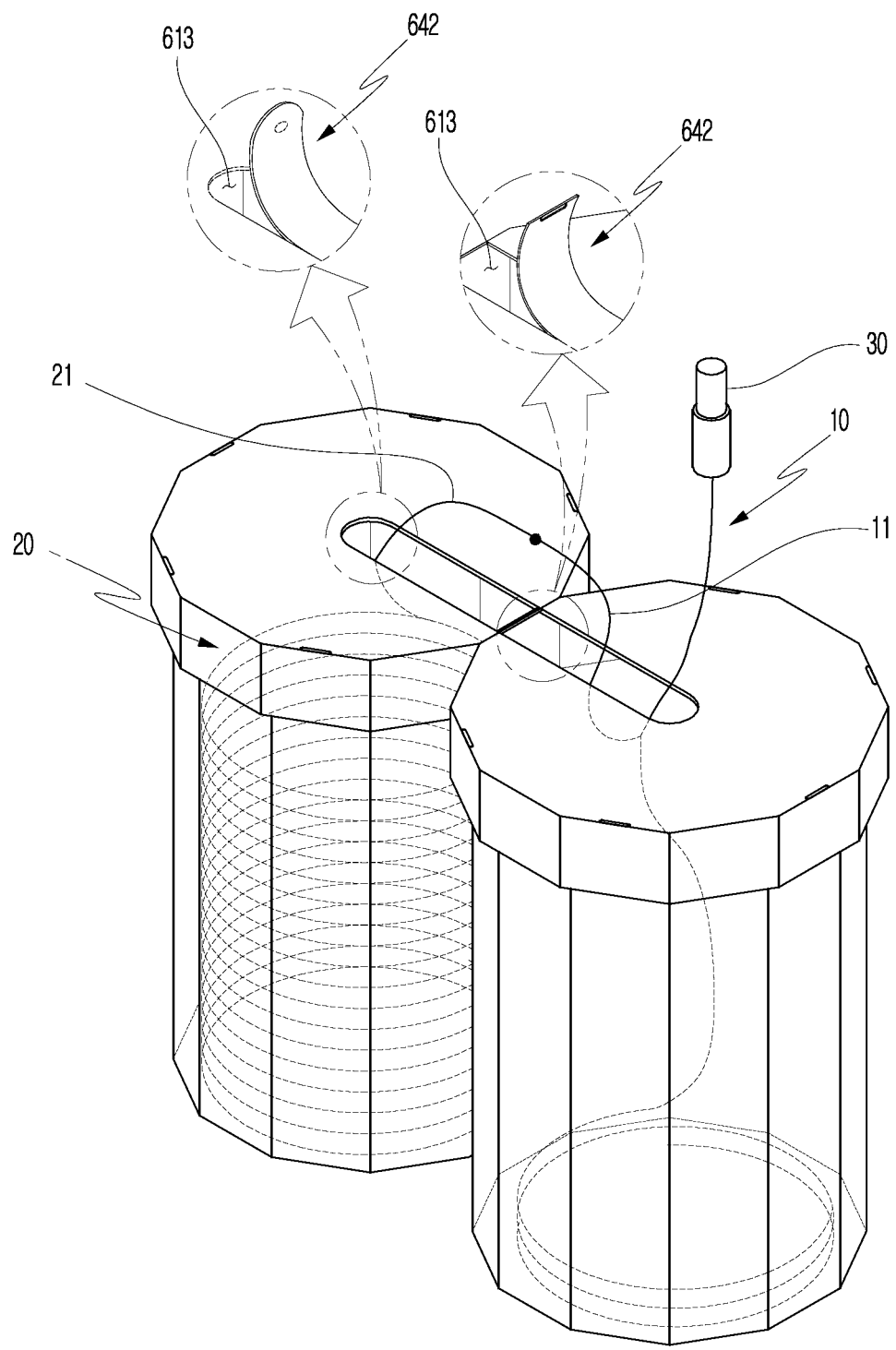

FIG. 15 is a perspective view illustrating a state in which the second perforated portion of the cover is used according to one embodiment of the present invention.

MODES OF THE INVENTION

Hereinafter, the present invention will be described in detail with reference to the accompanying drawings. However, embodiments of the present invention may be implemented in several different forms and are not limited to embodiments described herein. In addition, parts irrelevant to description are omitted in the drawings in order to clearly explain embodiments of the present invention. Similar parts are denoted by similar reference numerals throughout this specification.

Throughout this specification, when a part is referred to as being "connected" to another part, it includes being "directly connected" and "indirectly connected" via an intervening part. Also, when a certain part "includes" a certain component, this does not exclude other components unless explicitly described otherwise, and other components may be further included.

Hereinafter, embodiments of the present invention will be described in detail with reference to the accompanying drawings.

Figure 1:
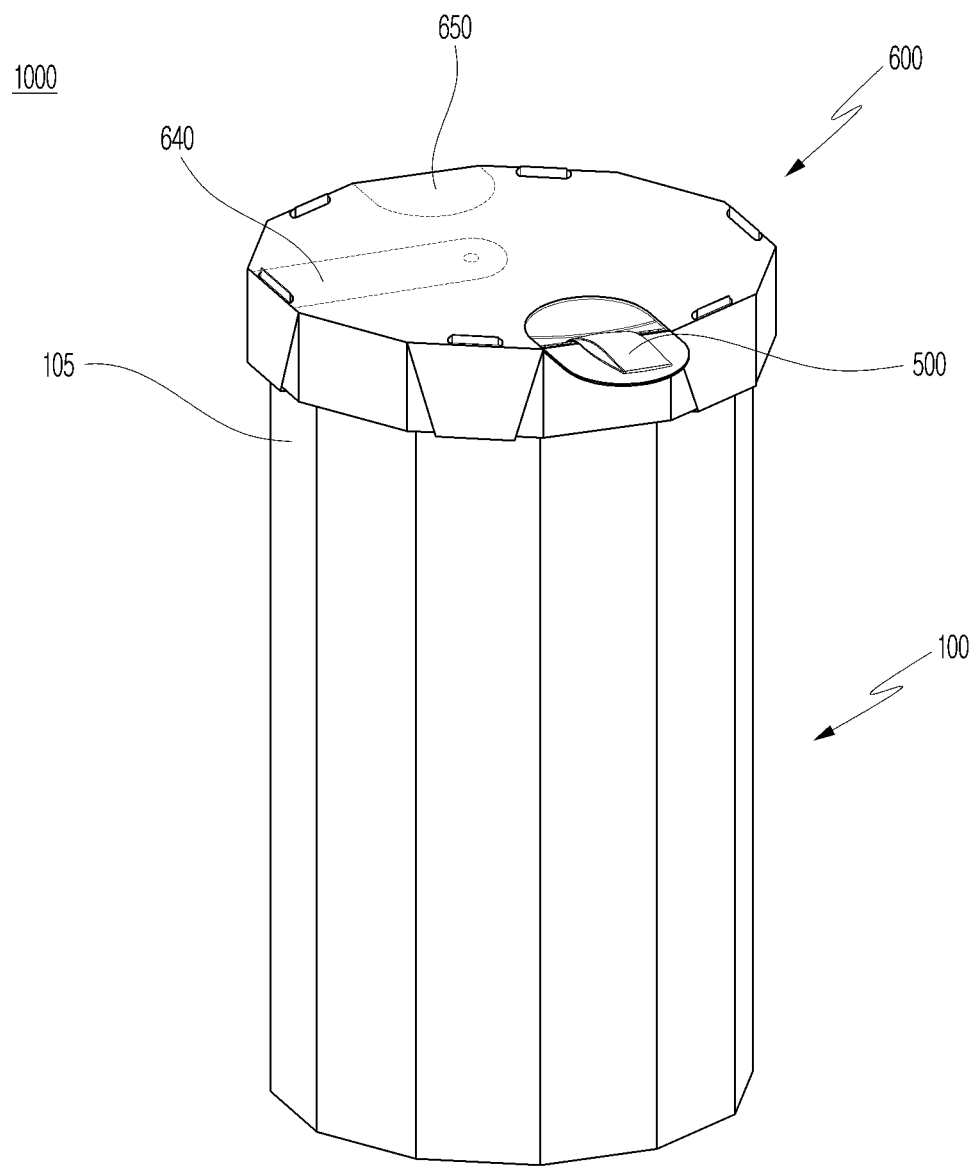
FIG. 1 is a perspective view illustrating an exterior of a storage container for a welding wire according to one embodiment of the present invention.

FIG. 1 is a perspective view illustrating an exterior of a storage container for a welding wire according to one embodiment of the present invention. In addition, the storage container for a welding wire of the present invention may be formed of a paper material.

Referring to FIG. 1, an exterior of a storage container 1000 for a welding wire may be formed by an outer case 100 and a cover 600. The outer case 100 may have a polygonal column shape, and a cross section thereof may have a regular 12 dodecagon. An upper portion of the outer case 100 is formed to open toward the outside. The cover 600 may have a polygonal column shape corresponding to the shape of the outer case 100 and having an internal space portion. The cover 600 closes the upper portion of the outer case 100 to protect an inner portion of the outer case 100. When the cover 600 closes the upper portion of the outer case 100, a part of the upper portion of the outer case 100 may be accommodated in the inner space portion of the cover 600.

Figure 2:
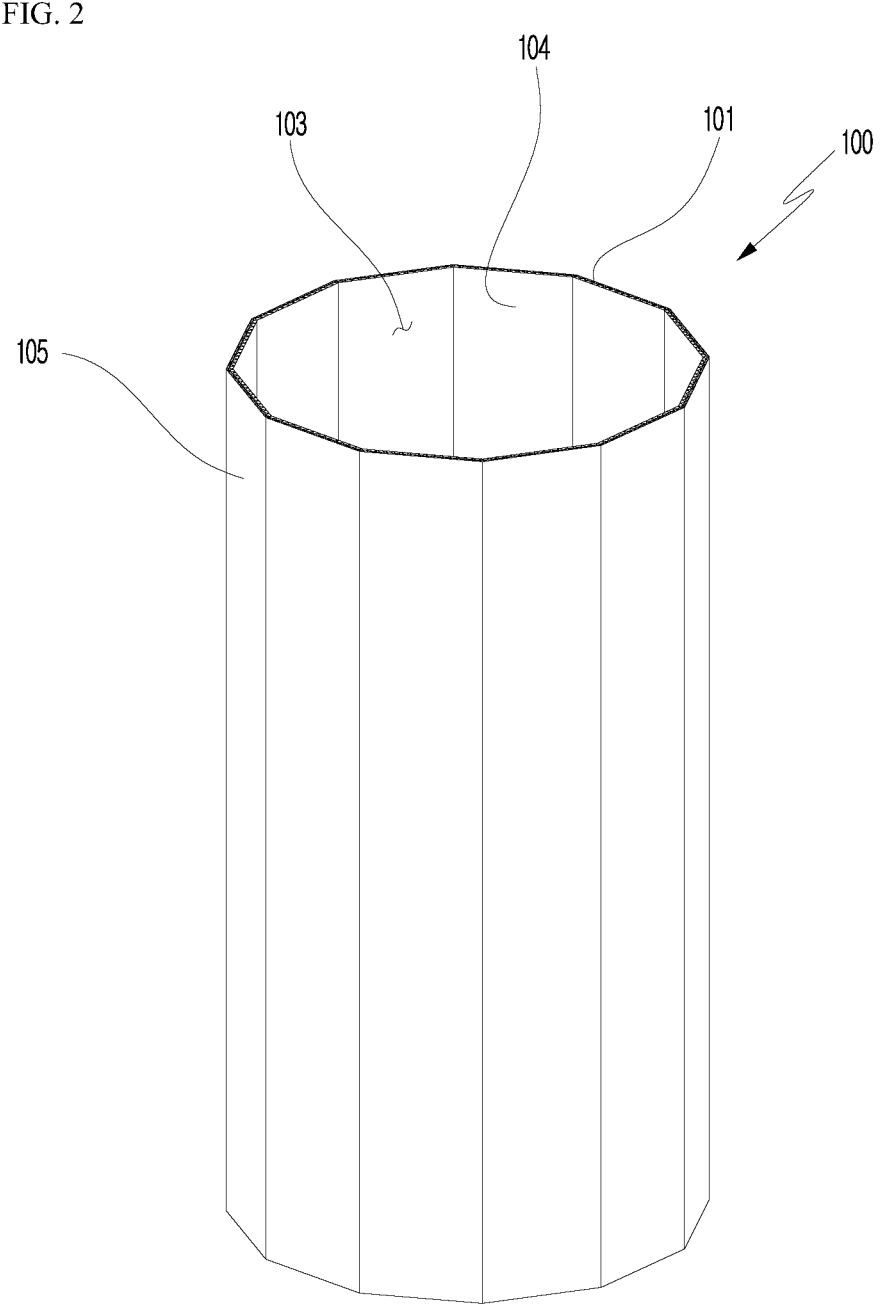
FIG. 2 is a perspective view illustrating an outer case according to one embodiment of the present invention.
Figure 3:
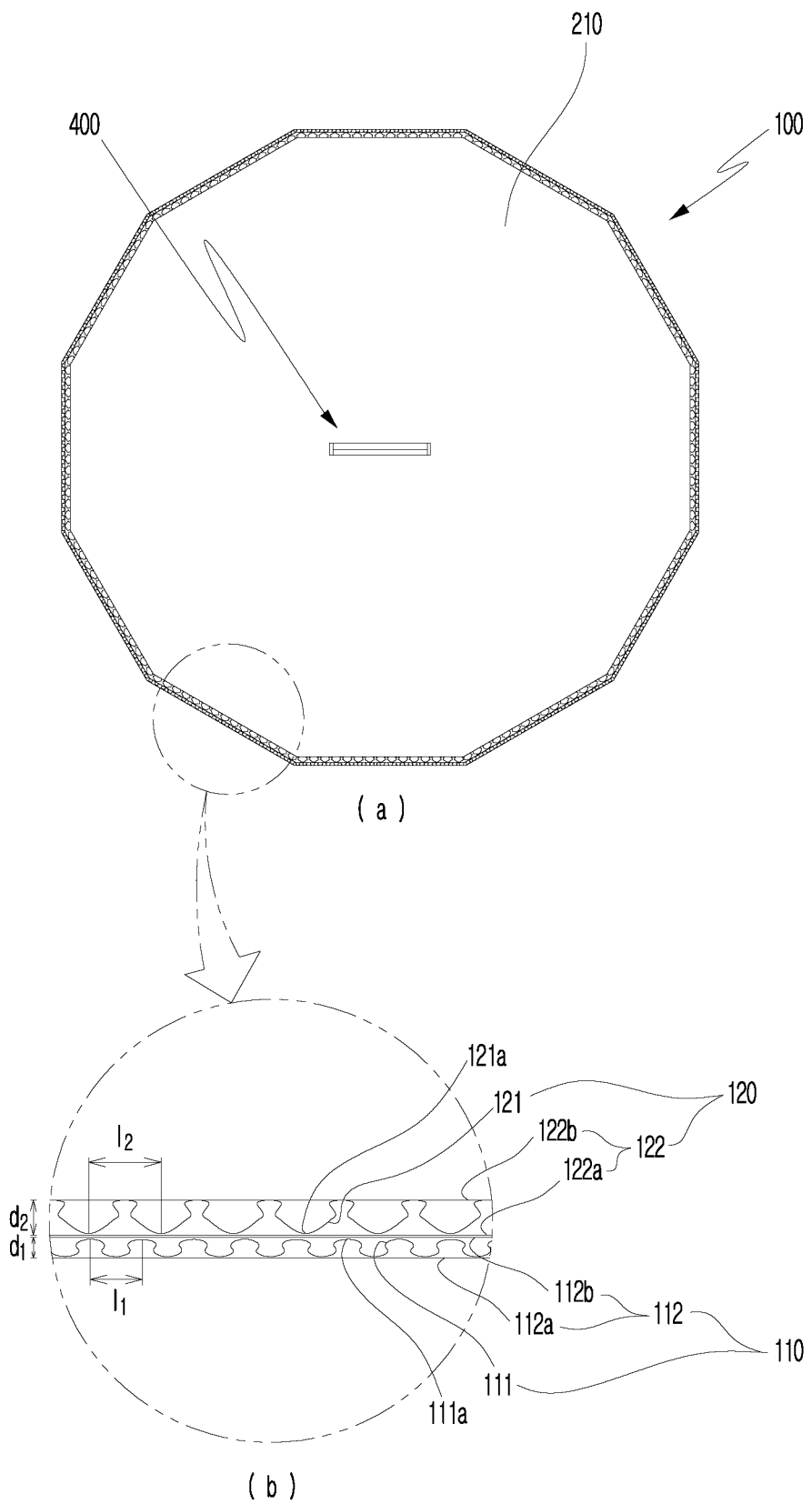
FIG. 3 is a plan view illustrating the outer case from above and a partially enlarged view illustrating a strength reinforcement part and a shock absorption part of the outer case of the present invention, respectively.
Figure 4:
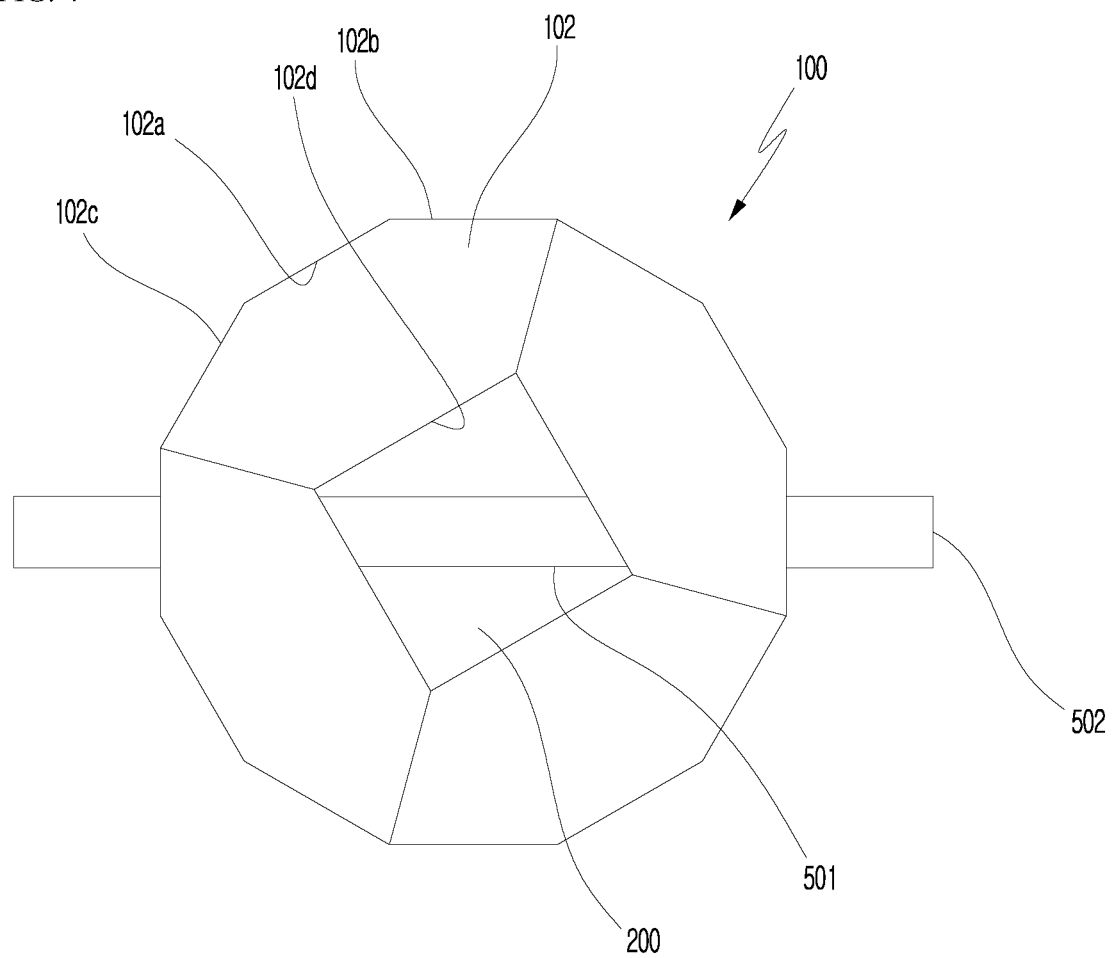
FIG. 4 is a bottom view illustrating the outer case from below.

FIG. 2 is a perspective view illustrating the outer case according to one embodiment of the present invention, FIGS. 3A and 3B are a plan view illustrating the outer case from above and a partially enlarged view illustrating a strength reinforcement part and a shock absorption part of the outer case of the present invention, respectively, and FIG. 4 is a bottom view illustrating the outer case from below.

Referring to FIGS. 2 to 4, the outer case 100 may have the polygonal column shape, an outer bottom support 102 may be formed in a lower portion of the outer case 100, and a wire accommodation portion 103 capable of accommodating a wound welding wire (not shown) may be formed in the outer case 100. In addition, an inner case, which will be described below, may be positioned in close contact with an inner surface 104.

The outer case 100 may include a strength reinforcement part 110 and a shock absorption part 120 formed inside the strength reinforcement part 110 to absorb an external impact.

The strength reinforcement part 110 includes a first paperboard 112 and a first fluted paper 111. A cross-sectional shape of the first fluted paper 111 may have a shape of a waveform of a substantial sin function. Due to the shape of the first fluted paper 111, a strength against a compressive load and a strength against a buckling load of the strength reinforcement part 110 can be improved. In addition, the first paperboard 112 may be formed of a first outer paperboard 112a and a first inner paperboard 112b.

The shock absorption part 120 includes a second paperboard 122 and a second fluted paper 121. A cross-sectional shape of the second fluted paper 121 may have a shape in which substantial pentagons are repeatedly disposed. Due to the shape of the second fluted paper 121, an impact force applied to the shock absorption part 120 is effectively absorbed. In addition, the second paperboard 122 may be formed of a second outer paperboard 122a and a second inner paperboard 122b. Meanwhile, according to one embodiment of the present invention, the first inner paperboard 112b and the second outer paperboard 122a may be integrally formed.

In addition, in the entire outer case 100, the strength reinforcement part 110 is formed at an outer side, and the shock absorption part 120 is formed at an inner side, and thus, when an impact is applied, the outer case 100 is not dented or broken, and the impact is not transmitted to a welding wire accommodated internally. Accordingly, even when another storage container 1000 for a welding wire, which stores a welding wire, is stacked on the storage container 1000 for a welding wire and applies a load thereto, the outer case 100 of the storage container 1000 for a welding wire positioned at a lower side is not buckled.

According to one embodiment of the present invention, an outer side of the strength reinforcement part 110 may be coated with a watertight synthetic resin. Accordingly, an inner portion can be protected from outside moisture or the like.

In one embodiment of the present invention, when the number of valleys 111a per unit length of the first fluted paper is C1, and the number of valleys 121a per unit length of the second fluted paper is C2, RC=C1/C2 may be in the range of 1.27 to 1.67, and preferably 1.37 to 1.57.

When RC is less than 1.27, a strength of the strength reinforcement part 110 may decrease, and thus the outer case 100 may be dented or broken. In some cases, the shock absorption part 120 may become resistant to an external impact, and thus the external impact may be transmitted to a welding wire accommodated internally, and the welding wire may be damaged.

Meanwhile, when RC is greater than 1.67, ease of manufacturability may be significantly degraded, or an impact absorption capacity of the shock absorption part 120 may be reduced.

Accordingly, as RC becomes a value within the numerical range, a strength and an impact absorption effect of the outer case 100 can be optimized.

According to one embodiment of the present invention, a thickness d2 of the shock absorption part 120 may be greater than a thickness d1 of the strength reinforcement part 110. Accordingly, the strength reinforcement part 110 can serve to provide a strength to the outer case 100, and the shock absorption part 120 can easily absorb an external impact applied to the outer case 100.

When the outer case 100 is viewed from below, the outer bottom support 102 may have a polygonal shape having an outer side having a middle side 102a, a first side 102b, and a second side 102c and an inner side 102d having a length smaller than a length of the outer side, and may preferably have a hexagonal shape. In addition, the middle side 102a of the outer bottom support 102 may be integrally formed with an outer surface 105 to extend from the outer surface 105, and the first side 102b and the second side 102c may be formed to be cut from the outer surface 105. Accordingly, the outer bottom support 102 may be folded or unfolded along the middle side 102a. Such an outer bottom support 102 may be provided as a plurality of outer bottom supports 102, and each of the outer bottom supports 102 may be folded inward to form an outer bottom of the outer case 100. In addition, the outer bottom support 102 may also be formed to have a structure like the strength reinforcement part 110 (see FIG. 3) and the shock absorption part 120 (see FIG. 3).

(a) of FIG. 5 is a cutaway view illustrating a state in which the outer case, a bottom part, the bottom reinforcement part, an elastic body maintaining member, and a strap are coupled according to one embodiment of the present invention, and (b) to (d) of FIG. 5 are partially enlarged views illustrating portions of (a) of FIG. 5.

Referring to FIGS. 5A to 5D, a bottom part 200 may have a polygonal shape corresponding to a cross-sectional shape of the outer case 100 and may be seated on and coupled to the outer bottom support 102. The bottom part 200 may also be formed to have a structure like the strength reinforcement part 110 (see FIG. 3) and the shock absorption part 120 (see FIG. 3). Accordingly, the bottom part 200 may not be easily dented or broken even by an external force applied in a vertical direction of the outer case 100, and the external force can be easily absorbed thereby to stably protect a welding wire accommodated internally.

A bottom reinforcement part 210 may be disposed on the bottom part 200. In addition, the bottom reinforcement part 210 may also be formed to have a structure like the strength reinforcement part 110 (see FIG. 3) and the shock absorption part 120 (see FIG. 3). Accordingly, the bottom reinforcement part 210 can easily absorb an impact applied when a welding wire is accommodated.

In a central portion of each of the bottom part 200 and the bottom reinforcement part 210, a cut groove (not shown) to which an elastic body maintaining member 400, which will be described below, may be insertion-coupled is formed.

The elastic body maintaining member 400 includes an insertion part 410 which is inserted upward through the cut groove (not shown) from below and an insertion support 420 which is formed under the insertion part 410 to set an insertion limit.

In this case, the insertion part 410 includes a hook portion 411 which is formed in a circular shape to hook an elastic body and a through path 412 which is formed to pass through from the outside of the insertion part 410 to the hook portion 411 so that the outside of the insertion part 410 communicates with the hook portion 411. That is, the elastic body may be moved into and easily coupled to the hook portion 411 through the through path 412.

The insertion support 420 is formed to support a lower surface of the bottom part 200 when the insertion part 410 is insertion-coupled through the cut groove (not shown). That is, the insertion part 410 is inserted until the insertion support 420 comes into contact with the lower surface of the bottom part 200, and when the insertion part 410 is completely inserted, the insertion support 420 supports the lower surface of the bottom part 200. At least two insertion supports 420 may be formed under the insertion part 410 in a lateral direction.

The elastic body maintaining member 400 may be formed of a paper material, and thus, when a welding wire accommodated in the storage container 1000 for a welding wire of the present invention is completely exhausted, a user may easily grasp the insertion support 420 and pull the insertion support 420 downward from above to separate the insertion part 410 from the cut groove (not shown) so as to easily discard the insertion support 420.

(a) and (b) of FIG. 6 are a cutaway view illustrating the inner case and a partially enlarged view illustrating a portion of FIG. 6A, respectively.

Referring to (a) and (b) of FIG. 6, an inner case 300 may have a cylindrical column shape. An inner bottom support 302 may be formed in a lower portion of the inner case 300, and a wire accommodation portion 303, which may store a wound welding wire (not shown), may be formed in the inner case 300. In addition, the inner case 300 may be detachably inserted into the outer case 100, and when the inner case 300 is inserted into the outer case 100, an outer surface 305 of the inner case 300 is in close contact with the inner surface 104 of the outer case 100. In this case, an upper end portion 101 of the outer case 100 and an upper end portion 301 of the inner case 300 may be formed at the same level.

The inner case 300 may be formed of a paper material. Specifically, since the inner case 300 may be formed of a hardboard material formed by pressing several paperboards, the cylindrical shape can be firmly maintained.

The inner bottom support 302 may be formed to have a structure like the strength reinforcement part 110 (see FIG. 3) and the shock absorption part 120 (see FIG. 3). Preferably, the inner bottom support 302 may be formed to have a structure in which two structures each having the strength reinforcement part 110 (see FIG. 3) and the shock absorption part 120 (see FIG. 3) are stacked in two stages. Accordingly, an impact applied when a welding wire is accommodated can be easily absorbed.

A hole 306 may be formed in a central portion of the inner bottom support 302. The insertion part 410 of the elastic body maintaining member 400 may be exposed through the hole 306, and the hook portion 411 of the insertion part 410 may be coupled to a tension spring.

FIGS. 7A and 7B are an exploded assembly view illustrating a state in which the inner case is inserted into the outer case along an axis L and the cover is covered on upper portions of the inner and outer cases and a view illustrating a state in which the outer case and the inner case of the present invention are coupled, respectively.

Referring to FIGS. 7A and 7B, the outer case 100 and the inner case 300 may be assembled by inserting the inner case 300 into the outer case 100 to bring the inner surface 104 of the outer case 100 into close contact with the outer surface 305 of the inner case 300 and coupling the cover 600 to an upper portion of each of the outer case 100 and the inner case 300.

In addition, when the inner case 300 is inserted into the outer case 100, a strap 500 may be interposed between the outer surface 305 of the inner case 300 and the inner surface 104 of the outer case 100. Accordingly, the strap 500 except for a portion exposed to the outside of the outer case 100 is stably maintained by a friction force between the inner case 300 and the outer case 100.

Referring to FIGS. 3, 6, and 7, the outer case 100 and the inner case 300 may be coupled so that a structure of three total layers is formed by the strength reinforcement part 110, the shock absorption part 120, and the inner case 300. Accordingly, the storage container 1000 for a welding wire of the present invention can stably protect a welding wire accommodated therein against an external impact applied in the lateral direction and may not be bent or broken even when a buckling load is applied from above.

Referring to FIGS. 5 and 6, when the outer case 100 and the inner case 300 are coupled, a structure of four total layers may be formed by the outer bottom support 102, the bottom part 200, the bottom reinforcement part 210, and the inner bottom support 302. Accordingly, a weight of a welding wire accommodated internally can be stably supported, and the welding wire can be stably protected against a vertical load and an impact applied to the storage container 1000 for a welding wire according to one embodiment of the present invention.

FIG. 8 is a perspective view illustrating a portion of the outer case according to one embodiment of the present invention.

Meanwhile, referring to FIGS. 1 to 5, and 8, the storage container 1000 for a welding wire according to one embodiment of the present invention further includes the strap 500. The strap 500 may be formed of a synthetic resin material such as nylon or polyester. A central portion 501 of the strap 500 may be disposed between the outer bottom support 102 and the bottom part 200. In addition, two end portions 502 of the strap 500 may be exposed through strap exposure parts 650 formed opposite to each other in a blocking part 610 of the cover 600, which will be described below, to form hanging parts 510.

When a welding wire is accommodated in the storage container 1000 for a welding wire of the present invention, the central portion 501 of the strap 500 is pressed by the welding wire. In addition, arms (not shown) of a lifting device are inserted into hanging parts 510 at two sides, and the storage container 1000 for a welding wire is transported in a state of being separated from the ground surface. In this case, the strap 500 can stably support a weight of the welding wire.

In addition, the strap 500 may be disposed so that, when the hanging part 510 at one side is pulled, the hanging part 510 at the other side may be moved in a state in which the strap is not stuck to the outer case 100. Accordingly, it is not only easy to assemble, but also easy to separate when the storage container 1000 for a welding wire of the present invention is discarded.

In addition, even when the strap 500 and the outer case 100 are not stuck to each other, since the bottom part 200 or the like is disposed on the strap 500, and a welding wire is accommodated thereon and transported, the strap 500 is not easily moved because of a weight of the welding wire. Accordingly, it is stable in accommodating and transporting the welding wire.

FIG. 9 is a development view illustrating the cover according to one embodiment of the present invention, FIG. 10 is an assembly view of a main portion for showing a process of assembling the cover according to one embodiment of the present invention, and FIG. 11 is a perspective view illustrating the assembled cover according to one embodiment of the present invention.

Referring to FIGS. 9 to 11, the cover 600 of the present invention forms the cover 600 of the storage container for a welding wire through assembly. The cover 600 is formed to be attached to and detached from the upper portion of the outer case 100 and to selectively close the upper portion of the outer case 100.

Such a cover 600 may be formed of a paper material. Accordingly, when the storage container 1000 for a welding wire is discarded, the assembly type cover 600 may be recycled into waste paper.

The cover 600 of the present invention includes the blocking part 610, a side surface forming part 620, and a side surface fixing part 630.

The blocking part 610 is formed in a shape corresponding to a cross section of the outer case 100.

The blocking part 610 covers the upper portion of the outer case 100 when the cover 600 is coupled to the outer case 100.

The side surface forming part 620 is bent from the blocking part 610 to form a side surface of the cover 600. Such a side surface forming part 620 surrounds and is fitted onto an outer surface of the upper portion of the outer case 100 when coupled to the outer case 100.

The side surface forming part 620 and the side surface fixing part 630 are alternately connected to sides of the blocking part 610. That is, the side surface forming part 620 and the side surface fixing part 630 are alternately provided along the sides of the blocking part 610.

The side surface forming part 620 includes a side surface extension member 621 and a wing member 622.

The side surface extension member 621 has a width corresponding to the side of the blocking part 610 and extends from the blocking part 610. In this case, a length of the side surface extension member 621 extending from the blocking part 610 becomes a height of the cover 600.

The wing member 622 is provides as a pair of wing members 622 connected to two sides of the side surface extension member 621. An edge of the wing member 622 is formed in contact with a first fixing extension member 631, a connection member 632, and a second fixing extension member 633 in a state in which the side surface forming part 620 and the side surface fixing part 630 are deployed. Such a wing member 622 may be manufactured through an operation of cutting a boundary line L in a state of being connected to the first fixing extension member 631, the connection member 632, and the second fixing extension member 633.

The side surface forming part 620 having the side surface extension member 621 and the wing member 622 is bent from the blocking part 610 to form a side portion of the cover 600.

Meanwhile, the side surface fixing part 630 and the side surface forming part 620 are alternately provided along the sides of the blocking part 610, and the side surface fixing part 630 fixes the adjacent side surface forming part 620.

The side surface fixing part 630 includes the first fixing extension member 631, the connection member 632, and the second fixing extension member 633.

The first fixing extension member 631 extends from the side of the blocking part 610. In this case, the first fixing extension member 631 fixedly supports an outer surface of the wing member 622 bent from the side surface extension member 621.

The connection member 632 is formed to connect the first fixing extension member 631 and the second fixing extension member 633. That is, one end portion of connection member 632 is connected to first fixing extension member 631, and the other end portion of connection member 632 is connected to the second fixing extension member 633.

In this case, the connection member 632 extends to a predetermined length from the first fixing extension member 631. Due to the connection member 632, a separation distance between the first fixing extension member 631 and the second fixing extension member 633 is formed so that the first fixing extension member 631 and the second fixing extension member 633, which are bent from the two end portions of the connection member 632, fixedly support the wing member 622.

The second fixing extension member 633 is connected to the other end portion of the connection member 632 and fixedly supports an inner surface of the wing member 622 bent from the side surface extension member 621. That is, the second fixing extension member 633 is bent from the other end portion of the connection member 632 and fixedly supports the inner surface of the wing member 622.

An insertion member 634 may be provided on an end portion of the second fixing extension member 633 so that the side surface fixing part 630 may be fixedly supported by the blocking part 610. Specifically, a fitting hole 611 is formed in a central portion of the side of the blocking part 610 to which the side surface fixing part 630 extending from the blocking part 610 is connected. The insertion member 634 may be insertion-coupled to the fitting hole 611, and the side surface fixing part 630 may be coupled to the blocking part 610 in a state of fixedly supporting the wing member 622.

In this case, the insertion member 634 and the fitting hole 611 may be coupled in a forced fitting manner.

A specific shape of the side surface fixing part 630 based on the development view of FIG. 9 is that a width of the first fixing extension member 631 gradually decreases as extending from the blocking part 610. That is, the first fixing extension member 631 is formed in a trapezoidal shape of which the width decreases outward from the blocking part 610.

In addition, the second fixing extension member 633 is formed in a shape of which a width increases as extending from the other end portion of the connection member 632. That is, the second fixing extension member 633 is formed in an inverted trapezoidal shape of which the width increases as extending outward from the blocking part 610.

As described above, as the first fixing extension member 631 is formed so that a width decreases toward the connection member 632, a length of the wing member 622 inserted into a separation space of the first fixing extension member 631 and the second fixing extension member 633 may increase.

In addition, as the second fixing extension member 633 is formed so that the width increases as extending from the connection member 632, a support area for the wing member 622 increases, and thus the side surface fixing part 630 firmly supports the side surface forming part 620.

Such a cover 600 is easy to manufacture because of a simple assembly structure. In addition, since a separate fastening member for fastening the cover 600 is not required, manufacturing costs of the cover 600 can be reduced.

In addition, since the cover 600 is formed of the paper material, additional industrial waste is not generated when the cover 600 is discarded.

FIGS. 12A and 12B are views illustrating a first perforated portion and a second perforated portion included in the cover according to one embodiment of the present invention, respectively.

Referring to FIG. 12, the cover 600 of the present invention may further include a perforated portion 640 which is formed in the blocking part 610 to be cut so that a welding wire wound in the case body is withdrawn.

The perforated portion 640 may be formed to be partially cut according to a particular shape and easily torn by the user. That is, the user may directly use the cover 600 without using a separate head cap member and may withdraw and use the welding wire through a portion torn along the perforated portion 640.

The perforated portion 640 may include a first perforated portion 641 and a second perforated portion 642 which are formed to be used according to a user's intention to use.

In this case, the first perforated portion 641 is used when the storage container 1000 for a welding wire is used as an adapter connection type, and the second perforated portion 642 is used when the storage container 1000 for a welding wire is used as an endless type.

That is, the storage container 1000 for a welding wire for two application types can be implemented through the cover 600 including the first perforated portion 641 and the second perforated portion 642.

Referring to (a) of FIG. 12, the first perforated portion 641 may be formed at a center of the blocking part 610 and formed in a circular shape.

In this case, a coupling hole 612 may be formed in a portion torn along the first perforated portion 641, and a connection adopter 700, which will be described below, may be coupled through the coupling hole 612.

That is, the first perforated portion 641 is used when the storage container 1000 for a welding wire is used as the adapter connection type.

According to one embodiment, the first perforated portion 641 may include a first arc part 641a and a second arc part 641b in which ratios of cut portions c per unit length d is different from each other. Preferably, the first arc part 641a and the second arc part 641b may be formed to have semicircular arc shapes.

In this case, a ratio R1 of the cut portion per unit length of the first arc part 641a may be greater than a ratio R2 of the cut portion per unit length of the second arc part 641b.

Accordingly, when the user uses fingers to tear off the first perforated portion 641, the first arc part 641a having the higher ratio of the cut portion per unit length is torn first, and then the second arc part 641b having the lower ratio of the cut portion per unit length may be torn so that the first perforated portion 641 can be more easily torn.

Referring to FIG. 12B, the second perforated portion 642 may be formed lengthily from one side of the blocking part 610 to a central portion of the blocking part 610.

More specifically, the second perforated portion 642 may include a first straight portion 642a and a second straight portion 642b which are formed in parallel from one side to the central portion of the blocking part 610, a curved portion 642c formed in the central portion of the blocking part 610 to connect the first straight portion 642a and the second straight portion 642b, and a third straight portion 642D which overlaps one side of the blocking part 610 to connect the first straight portion 642a and the second straight portion 642b.

In this case, a withdrawal space portion 613 may be formed in a portion torn along the second perforated portion 642, and a welding wire wound in the storage container may be withdrawn through the withdrawal space portion 613.

Accordingly, when the storage container 1000 for a welding wire is used as the endless type which will be described below, withdrawal space ports 613 of two storage containers disposed adjacent to each other may be connected to each other, and thus the user can more easily implement the endless type storage container.

Meanwhile, the second perforated portion 642 may be formed so that the first perforated portion 641 formed at the center of the blocking part is positioned in an area surrounded by the second perforated portion 642.

Accordingly, when the cover 600 is used as the adapter connection type and discarded, the cover 600 may be quickly removed due to the second perforated portion 642 even without separation of the coupled connection adopter 700, and thus disposal efficiency can be improved.

According to the one embodiment, at least one of the curved portion 642c and the third straight portion 642d may have a different ratio of the cut portion c per unit length d from that of the first and second straight portions 642a and 642b.

That is, a ratio R3 of the cut portion per unit length of at least one of the curved portion 642c and the third straight portion 642d may be greater than a ratio R4 of the cut portion per unit length of the first straight portion 642a and the second straight portion 642b.

Accordingly, when the user uses fingers to tear off the second perforated portion 642, the curved portion 642c or the third straight portion 642d having the higher ratio of the cut portion per unit length may be torn first, and then the first straight portion 642a and the second straight portion 642b may be torn, so that the second perforated portion 642 can be torn more easily.

The cover 600 of the present invention may further include the strap exposure part 650 which is formed in the blocking part 610 to be cut so that the strap 500 is exposed to the outside.

The strap 500 may be exposed to the outside through an opening formed after the strap exposure part 650 is removed.

FIGS. 13A and 13B are an exploded view and a coupling view illustrating the connection adopter according to one embodiment of the present invention, respectively, and FIG. 14 is a sequence diagram illustrating a process in which the connection adopter is coupled to the cover according to one embodiment of the present invention. A case in which the cover 600 is used as the adapter connection type will be described with reference to FIGS. 13 and 14. The cover 600 of the present invention may further include the connection adopter 700 which is detachably coupled through the coupling hole 612 formed when the first perforated portion 641 is removed.

The connection adopter 700 may be formed to be easily and quickly coupled through the coupling hole 612 and formed of a hard material such as metal.

A welding wire wound in the storage container may be used as a welding material which is guided to the outside by the connection adopter 700 while continuously being withdrawn through a cable member 40 coupled to the connection adopter 700.

The connection adopter 700 may include a connection part 710, a first washer 720, a second washer 730, and a nut 740.

The connection part 710 is a part forming a body of the connection adopter 700 and may include a support 711, a first bolt part 712 formed on the support 711, a second bolt part 713 formed under the support 711, and a through hole formed to pass in a central axis direction of the connection part 710.

In this case, the welding wire wound in the storage container may be withdrawn to the outside through the through hole.

The support 711 is a part which is in contact with and supported by an upper portion of the blocking part 610 when the connection adopter 700 is coupled and integrally formed with the first bolt part 712 and the second bolt part 713.

In addition, the support 711 is disposed between the first and second bolt parts 712 and 713 to support the first and second bolt parts 712 and 713, and a diameter of the support 711 may be greater than a diameter of each of the first and second bolt parts 712 and 713.

The second bolt part 713 is inserted through the coupling hole 612 formed in the blocking part 610 and is no longer inserted when a lower portion of the support 711 comes into contact with and is supported by the upper portion of the blocking part 610.

In this case, the first washer 720 may be provided between the upper portion of the blocking part 610 and the lower portion of the support 711. The first washer 720 is a part having a ring shape in which an inner hole is formed and serves to protect an upper surface of the blocking part 610 by dispersing a pressure when coupled.

That is, the first washer 720 is fitted onto the second bolt part 713 of the connection part 710, and the second bolt part 713 is inserted into the coupling hole 612 of the blocking part 610 in a state in which the first washer 720 is fitted onto the second bolt part 713.

The nut 740 is coupled to the second bolt part 713 under the blocking part 610 when the second bolt part 713 is inserted into the coupling hole 612.

In this case, the second washer 730 may be provided between a lower portion of the blocking part 610 and an upper portion of the nut 740. The second washer 730 is a part having a ring shape in which an inner hole is formed and serves to protect a lower surface of the blocking part 610 by dispersing a pressure when coupled.

When the connection adopter 700 is coupled to the cover 600, the cable member 40 for withdrawing the welding wire may be connected to the first bolt part 712.

As described above, the connection adopter 700 may be firmly and easily coupled to the cover 600 and easily removed from the cover 600 when the welding wire accommodated in the storage container is completely exhausted.

FIG. 15 is a perspective view illustrating a state in which the second perforated portion of the cover is used according to one embodiment of the present invention.

A case in which the cover 600 is used as the endless type will be described with reference to FIG. 15. First, two storage containers are disposed adjacent to each other. In this case, in the two storage containers, the second perforated portions 642 provided in the covers 600 should be disposed to face each other.

Then, the second perforated portions 642 provided in the covers 600 are removed so that the withdrawal space portions 613 are formed in the covers 600. In this case, the second perforated portions 642 may be more easily torn using the curved portions 642c or the third straight portions 642d in which the ratio of the cut portion per unit length is high.

In addition, a welding wire 10 wound in the storage container at one side is connected a withdrawal device 30 and used, and when the wound welding wire 10 is almost exhausted, a last end 11 of the welding wire 10 at one side is connected to a leading end 21 of a welding wire 20 wound in the storage container at the other side. In this case, the welding wires can be more easily connected because the second perforated portions 642 of the storage containers are adjacently disposed to face each other.

Accordingly, an endless welding wire can be used without reconnecting the withdrawal device 30 to a new welding wire.

Then, when the welding wire 10 wound in the storage container at one side is completely exhausted, the new storage container is disposed close like the beginning and the above process is repeated.

As described above, the user can more easily implement the endless type storage container using the cover 600 including the second perforated portion 642. Since the cover 600 of the present invention includes the perforated portion 640 and can be directly used without a separate head cap member and implemented as the adapter connection type or the endless type according to an application, there is an advantage of improving manufacturing efficiency.

As described above, since the storage container 1000 for a welding wire of the present invention is formed of the paper material, the storage container 1000 for a welding wire is easy to disassemble and recycle when the wound welding wire is all exhausted. Accordingly, costs required to discard the storage container for a welding wire as industrial waste can be reduced after the storage container for a welding wire is all used.

The above description is only exemplary, and it will be understood by those skilled in the art that the invention may be performed in other concrete forms without changing the technological scope and essential features. Therefore, the above-described embodiments should be considered as only examples in all aspects and not for purposes of limitation. For example, each component described as a single type may be implemented in a distributed manner, and similarly, components that are described as being distributed may be implemented in a coupled manner.

The scope of the present invention is defined by the appended claims and encompasses all modifications or alterations derived from meanings, the scope, and equivalents of the appended claims.

REFERENCE NUMERALS

100: OUTER CASE
101: UPPER END PORTION OF OUTER CASE
102: OUTER BOTTOM SUPPORT
102a: MIDDLE SIDE
102b: FIRST SIDE
102c: SECOND SIDE
102d: INNER SIDE
103: WIRE ACCOMMODATION PORTION
104: INNER SURFACE OF OUTER CASE
105: OUTER SURFACE OF OUTER CASE
110: STRENGTH REINFORCEMENT PART
111: FIRST FLUTED PAPER
111a: VALLEY OF FIRST FLUTED PAPER
112: FIRST PAPERBOARD
112a: FIRST OUTER PAPERBOARD
112b: FIRST INNER PAPERBOARD
120: SHOCK ABSORPTION PART
121: SECOND FLUTED PAPER
121a: VALLEY OF SECOND FLUTED PAPER
122: SECOND PAPERBOARD
122a: SECOND OUTER PAPERBOARD
122b: SECOND INNER PAPERBOARD
200: BOTTOM PART
210: BOTTOM REINFORCEMENT PART
300: INNER CASE
301 UPPER END PORTION OF INNER CASE
302: INNER BOTTOM SUPPORT
303: WIRE ACCOMMODATION PORTION
304: INNER SURFACE OF INNER CASE
305: OUTER SURFACE OF INNER CASE
306: HOLE
400: ELASTIC BODY MAINTAINING MEMBER
410: INSERTION PART
411: HOOK PORTION
412: THROUGH PATH
420: INSERTION SUPPORT
500: STRAP
501: CENTRAL PORTION OF STRAP
502: TWO END PORTIONS OF STRAP
510: HANGING PART
600: CAP
610: BLOCKING PART
620: SIDE SURFACE FORMING PART
630: SIDE SURFACE FIXING PART
640: PERFORATED PORTION
650: STRAP EXPOSURE PART
700: CONNECTION ADOPTER
1000: STORAGE CONTAINER FOR WELDING WIRE

The invention claimed is:

1. A storage container for a welding wire, comprising:
an outer case having a lower end at which an outer bottom support is formed and an inner portion in which a wire accommodation portion for accommodating a wound welding wire is formed;
a bottom part seated on and coupled to the outer bottom support;
an inner case which is in close contact with an inner surface of the outer case and has a lower portion in which an inner bottom support on which the bottom part is seated is formed; and
a cover which is formed to correspond to a shape of the outer case and closes an upper portion of the outer case, wherein the cover includes:
a blocking part which is formed in a shape corresponding to a cross section of the outer case and closes the upper portion of the outer case; and
a perforated portion formed in the blocking part to be cut so that the welding wire wound in the outer case is withdrawn to an outside,
wherein the perforated portion includes:
a first perforated portion formed in a circular shape in a central portion of the blocking part; and
a second perforated portion including:
a first straight portion and a second straight portion formed in parallel from one side to the central portion of the blocking part;
a curved portion formed to connect the first straight portion and the second straight portion in the central portion of the blocking part; and
a third straight portion which overlaps the one side of the blocking part and is formed to connect the first straight portion and the second straight portion.

2. The storage container of claim 1, further comprising an elastic body maintaining member which passes and is inserted through a cut groove of the bottom part and is formed to hook an elastic body.

3. The storage container of claim 2, wherein:
the elastic body maintaining member includes an insertion part which passes and is inserted upward through the cut groove from under the bottom part and an insertion support formed under the insertion part to set an insertion limit; and
the insertion part includes a hook portion having a circular hole shape in which the elastic body is hooked and a through path formed to pass through from an outside of the insertion part to the hook portion so that the outside of the insertion part communicates with the hook portion.

4. The storage container of claim 1, wherein the cover further includes:
a side surface forming part that is connected to the blocking part and is bent from the blocking part to surround and be fitted onto an outer surface of the upper portion of the outer case; and
a side surface fixing part which is alternately provided with the side surface forming part along a side of the blocking part and fixes an adjacent side surface forming part.

5. The storage container of claim 1, wherein the second perforated portion is formed so that the first perforated portion formed in the central portion of the blocking part is positioned in an area surrounded by the second perforated portion.

6. The storage container of claim 1, wherein:
the first perforated portion includes a first arc portion and a second arc portion of which ratios of cut portions per unit length are different; and the ratio (R1) of the cut portion per unit length of the first arc part is greater than the ratio (R2) of the cut portion per unit length of the second arc portion.

7. The storage container of claim 1, wherein a ratio (R3) of a cut portion per unit length of at least one of the curved portion and the third straight portion is greater than a ratio (R4) of a cut portion per unit length of the first straight portion and the second straight portion.

8. The storage container of claim 1, wherein at least one of the outer case, the outer bottom support, the bottom part, and the inner bottom support includes:
   a strength reinforcement part; and
   a shock absorption part which is formed inside the strength reinforcement part and absorbs an external impact.

\* \* \* \* \*